April 22, 1924.
L. L. MARY
SHOCK ABSORBER
Filed Oct. 5, 1920
1,491,018
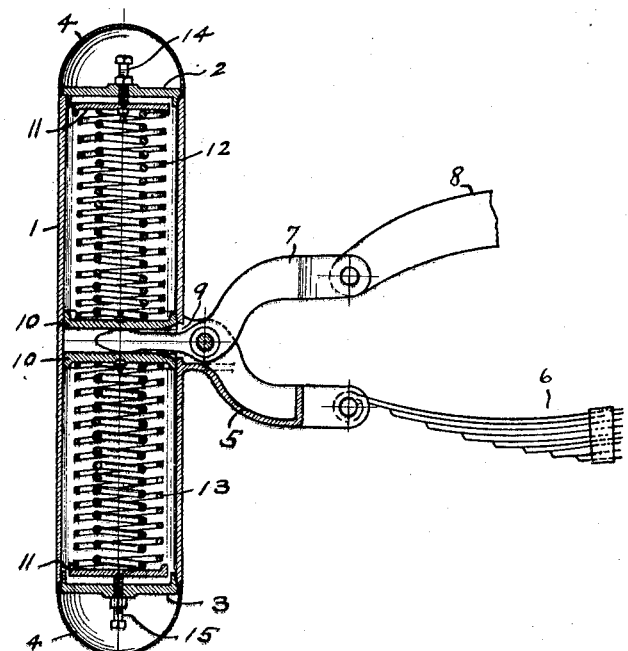
Fig. 1.
Fig. 2.

Patented Apr. 22, 1924.

1,491,018

UNITED STATES PATENT OFFICE.

LOUIS L. MARY (NOW BY JUDICIAL CHANGE OF NAME, LOUIS LEON LOMAR), OF HOUSTON, TEXAS.

SHOCK ABSORBER.

Application filed October 5, 1920. Serial No. 414,746.

*To all whom it may concern:*

Be it known that I, LOUIS L. MARY (now by judicial change LOUIS LEON LOMAR), a citizen of the United States, residing at Houston, in the county of Harris and State of Texas, have invented certain new and useful Improvements in a Shock Absorber, of which the following is a specification.

This invention relates to new and useful improvements in a shock absorber.

One object of the invention is to provide a shock absorber of the character described which has been specially designed for application to motor vehicles for the purpose of absorbing shock incident to traveling over rough roads, and of relieving the springs and vehicle body of said shock.

Another object of the invention is to provide a shock absorber which is of simple construction and may be readily applied and which is effective in use.

With the above and other objects in view, the invention has particular relation to certain novel features of construction, operation and arrangement of parts, an example of which is given in this specification and illustrated in the accompanying drawings, wherein:—

Figure 1 is a vertical sectional view of the device, and

Figure 2 is a plan view.

Referring now more particularly to the drawings, wherein like numerals of reference designate similar parts in each of the figures, the numeral 1 refers to a tubular casing whose ends are closed by the end plates 2 and 3, said end plates being enclosed and protected by means of suitable caps 4, 4. Formed integrally with the casing and extending out laterally therefrom, at its approximate center, there is an arm 5 to the free end of which the vehicle spring 6 is pivoted. Pivoted to this arm there is a lever 7, the outer end of which is pivoted to the vehicle frame 8 and the inner end of which projects through the opening 9 of the casing. Arranged on opposite sides of said inner end are the discs 10, 10 which fit closely within said casing, and opposing these, within the respective end plates 2 and 3, are similar discs 11, 11. Interposed between the respective discs 10 and 11 are the coil springs 12 and 13, either single or double springs may be used, and in practice the spring 12 is made considerably stronger than the spring 13 for the reason that this spring receives the thrust of the load which is transmitted through the lever 7, and the spring 13 only receives the rebound. The tension on these respective springs may be varied by means of suitable tensioning screws 14 and 15, which are threaded through the plates 2 and 3 and whose inner ends rest against the discs 11.

It is intended that these absorbers shall be attached to the front and rear end of each side member of the frame, four of them constituting a set and in use the outer arm of the lever 7, to which the side member 8 is attached, will be considerably longer than the inner arm which projects between the plates 10, thus imparting great flexibility to the vehicle.

The pivotal connection of arm 5 and lever 7 with the spring and frame respectively of the vehicle serves to adapt the device as a whole to the relative movements of the spring and frame without torsional stress on any of the parts, thus adding further to the effective operation of the device.

What I claim is:—

1. A device of the character described, including in combination with a casing adapted to be pivotally connected to one of coacting frames and spring of a vehicle, a lever pivoted to said casing having an end extended into the casing and an end adapted to be pivotally connected to the other of said coacting elements, a cam on the inwardly extended end of said lever, and a yieldable element in said casing cooperating with said cam lever.

2. A device of the character described, including in combination with a casing adapted to be pivotally connected to one of coacting frame and spring of a vehicle, a lever pivoted to said casing having an end extended into the casing and an end adapted to be pivotally connected to the other of said coacting elements, a compound cam on the inwardly extended end of said lever, and a yieldable element in said casing adapted to be acted upon by different portions of said cam, accordingly, as said lever is operated pivotally in one direction or the other.

3. A shock absorber, including a tubular casing, end plates carried thereby, a lateral extension formed integrally with the casing, a lever pivoted to the casing, one end of which works through an opening in said casing, discs arranged within the casing on opposite sides of said end of said lever, discs arranged within the end plates of said casing, and yieldable members interposed between the respective discs on the opposite sides of said lever.

4. A shock absorber, including a tubular casing, end plates secured thereon, a lateral extension formed rigidly with said casing, a lever pivoted to the casing, one end of which projects through an opening, into the casing, yieldable members within the casing, one on each side of said lever, discs within the casing confining said yieldable members, and means carried by the respective end plates for varying the tension on said yieldable members.

In testimony whereof I have signed my name to this specification in the presence of two subscribing witnesses.

LOUIS L. MARY,
*Now by judicial change Louis Leon Lomar.*

Witnesses:
JNO. B. OLIVER.
WM. A. CATHEY.